United States Patent
Yen

(10) Patent No.: US 6,862,981 B1
(45) Date of Patent: Mar. 8, 2005

(54) FOOD PROCESSOR

(76) Inventor: Jen-Yen Yen, No. 22-1, Lane 3, Haochin Rd., Nanhsin Tsun, Yenpu Hsiang, Changhua County (TW)

( * ) Notice: Subject to any disclaimer, the term of this patent is extended or adjusted under 35 U.S.C. 154(b) by 0 days.

(21) Appl. No.: 10/923,310

(22) Filed: Aug. 23, 2004

(51) Int. Cl.⁷ ............................. A23N 1/00; A23N 1/02; A47J 43/046; A47J 43/07; A23L 1/00
(52) U.S. Cl. ............................. 99/492; 99/511; 99/513
(58) Field of Search .................. 99/492, 495, 509–513; 366/291, 297–300, 314, 601; 241/37.5, 92, 282.1, 282.2; 494/36, 37, 43, 47, 10, 85; 426/61, 63, 49, 52, 533, 599, 640, 231, 233

(56) References Cited

U.S. PATENT DOCUMENTS

| | | | |
|---|---|---|---|
| 2,844,176 A | * 7/1958 | Barrows et al. | 241/188.1 |
| 3,085,606 A | * 4/1963 | Moline | 99/511 |
| 4,506,601 A | * 3/1985 | Ramirez et al. | 99/511 |
| 5,222,430 A | * 6/1993 | Wang | 99/512 |
| 5,257,575 A | * 11/1993 | Harrison et al. | 99/511 |
| 5,355,784 A | * 10/1994 | Franklin et al. | 99/492 |
| 5,392,699 A | * 2/1995 | Tai | 99/492 |
| 5,417,152 A | * 5/1995 | Harrison | 99/492 |
| 5,924,357 A | * 7/1999 | Chen | 99/511 |
| 6,058,833 A | * 5/2000 | Ling et al. | 99/510 |
| 6,543,340 B1 | * 4/2003 | Fouquet | 99/511 |
| 6,609,455 B2 | * 8/2003 | Fouquet | 99/511 |
| 6,681,687 B2 | * 1/2004 | Areh et al. | 99/511 |

* cited by examiner

Primary Examiner—Timothy F. Simone
(74) Attorney, Agent, or Firm—Rosenberg, Klein & Lee

(57) ABSTRACT

A food processor is disclosed to have a rotary switch control member that the turnable about the pusher between a first position where two spring-supported actuating rods are held in touch with a respective touch-control switch to switch on the motor of the food processor, and a second position where the spring-supported actuating rods are released from the respective touch-control switches to switch off the motor of the food processor.

2 Claims, 5 Drawing Sheets

FOOD PROCESSOR

BACKGROUND OF THE INVENTION

1. Field of the Invention

The present invention relates to a food processor and more particularly, to an improved structure of food processor.

2. Description of the Related Art

FIGS. 1 and 2 show a food processor according to the prior art. According to this design, the food processor comprises a motor housing base 10, two containers 101, a work bowl 14, a strainer 15 with cutter blades 16, a top cover 17 having a center feed hole 170, and a pusher 19. The motor housing base 10 comprises two hook plates 12 respectively hooked in a respective hook hole 18 in the top cover 17, a motor (not shown) having a motor shaft 11, a connector 110 at the motor shaft 11 for the connection of the strainer 15, a speed control switch 100, a touch-control power switch 131, and an actuating rod 13 supported on a spring 130 and adapted to drive the touch-control power switch 131 to further switch on/off the motor. This design of food processor has numerous drawbacks as follows:

1. When the top cover 17 is closed on the motor housing base 10, the touch-control power switch 131 is automatically switched on. If the user wishes to switch off the food processor at this time, the user must operate the speed control switch 100 to the zero speed status. Frequently rotating the speed control switch 100 may cause the speed control switch 100 to wear quickly.
2. The touch-control power switch 131 is automatically switched on upon closing of the top cover 17 on the motor housing base 10, and it is dangerous to keep the cutter blades 16 constantly in rotation.
3. If the touch-control power switch 131 fails, the food processor becomes unworkable.
4. The connection between the hook plates 12 of the motor housing base 10 and the hook holes 18 of the top cover 17 cannot prevent vibration of the top cover 17 during operation of the food processor.

SUMMARY OF THE INVENTION

The present invention has been accomplished under the circumstances in view. According to one aspect of the present invention, the food processor comprises a motor housing base, the motor housing base having housed therein a motor; a work bowl mounted on the motor housing base; a strainer mounted inside the work bowl and coupled to the motor, the strainer having cutter blades mounted therein for cutting food; a top cover covered on the work bowl; a push inserted through the top cover for pushing food in the strainer; and power control structure adapted to control on/off of the motor; wherein the power control structure comprises two touch-control power switches mounted inside the motor housing base at two sides and adapted to switch on/off the motor, two sliding ways horizontally bilaterally formed in the work bowl at two sides, two actuating rods respectively vertically inserted through the sliding ways and adapted to switch on the touch-control power switches respectively, two spring members respectively mounted in the work bowl and connected to the actuating rods to hold the actuating rods away from the touch-control power switches, two through holes respectively formed in the top cover at two sides corresponding to the sliding ways of the work bowl, two locating plates respectively formed in the work bowl above the sliding ways, and a switch control member coupled to the pusher and turnable about the pusher to move the actuating rods between a first position where the actuating rods switch on the touch-control switches and a second position where the actuating rods switch off the touch-control switches, the switch control member comprising a center through hole coupled to the pusher, and two extension strips respectively extended from the periphery thereof at two sides and respectively inserted through the through holes of the top cover into contact with the sliding ways, the extension strips each having a bottom guide portion movable with the switch control member along the sliding ways and a retaining notch for engagement with the locating plates to hold the actuating rods in the first position.

According to another aspect of the present invention, the work bowl comprises a plurality of shock absorbing springs, and a plurality of shock absorbing rods respectively supported on the shock absorbing springs and pressed on the motor housing base to absorb shocks during rotation of the strainer with the motor shaft.

DETAILED DESCRIPTION OF THE PREFERRED EMBODIMENT

Figure 1:
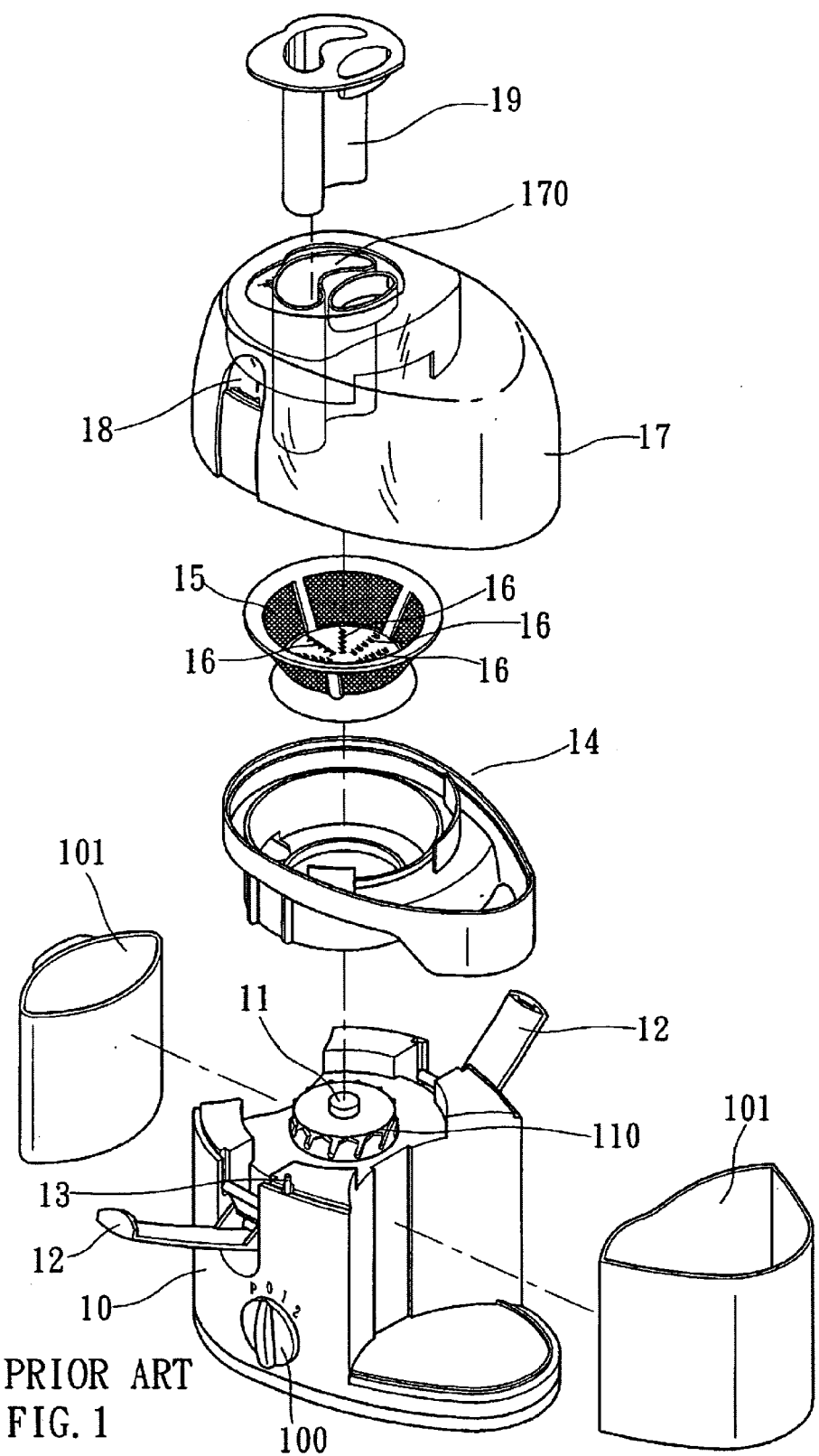
FIG. 1 is an exploded view of a food processor according to the prior art.
Figure 2:
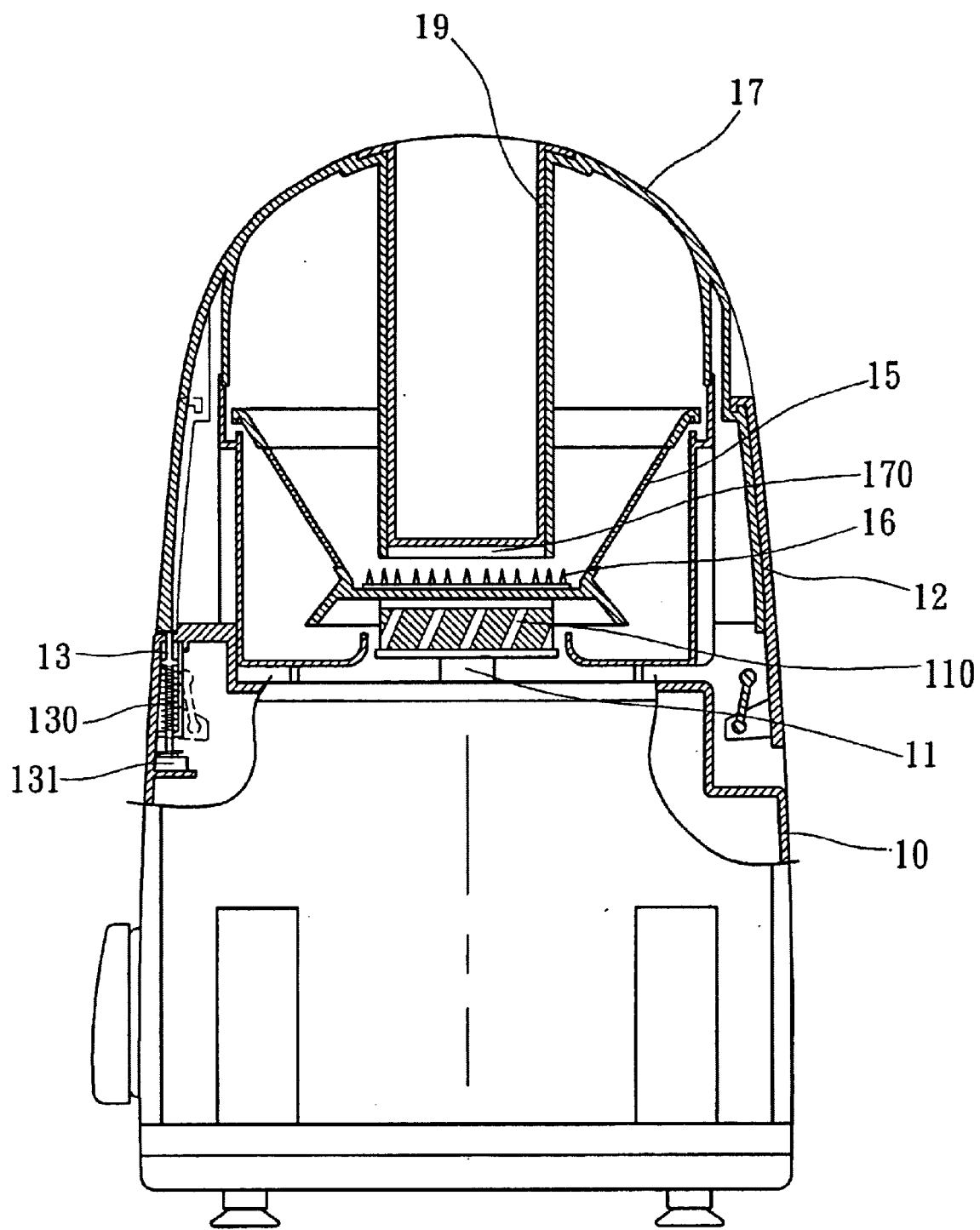
FIG. 2 is a sectional assembly view of the food processor according to the prior art.
Figure 3:
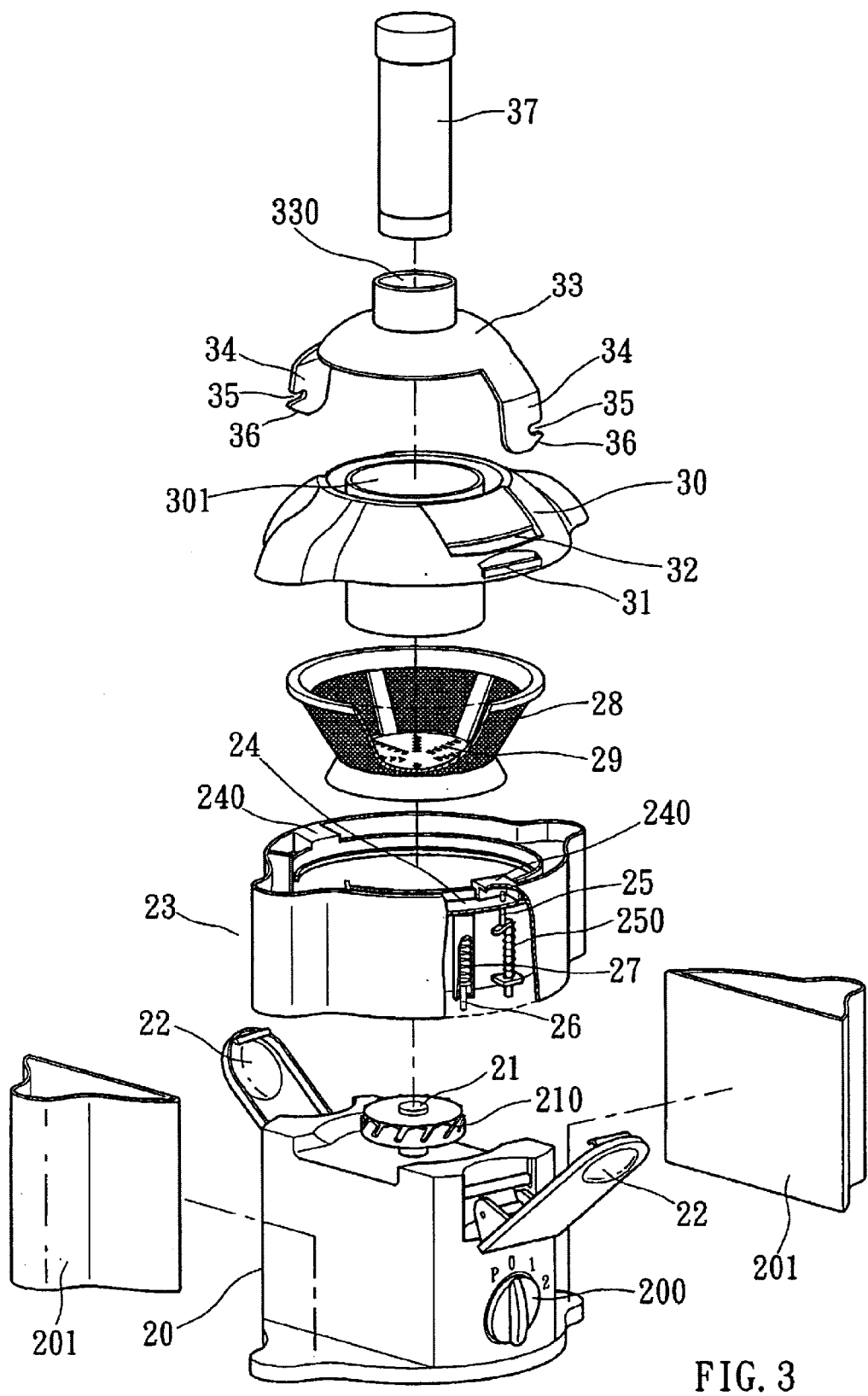
FIG. 3 is an exploded view of a food processor according to the present invention.
Figure 4:
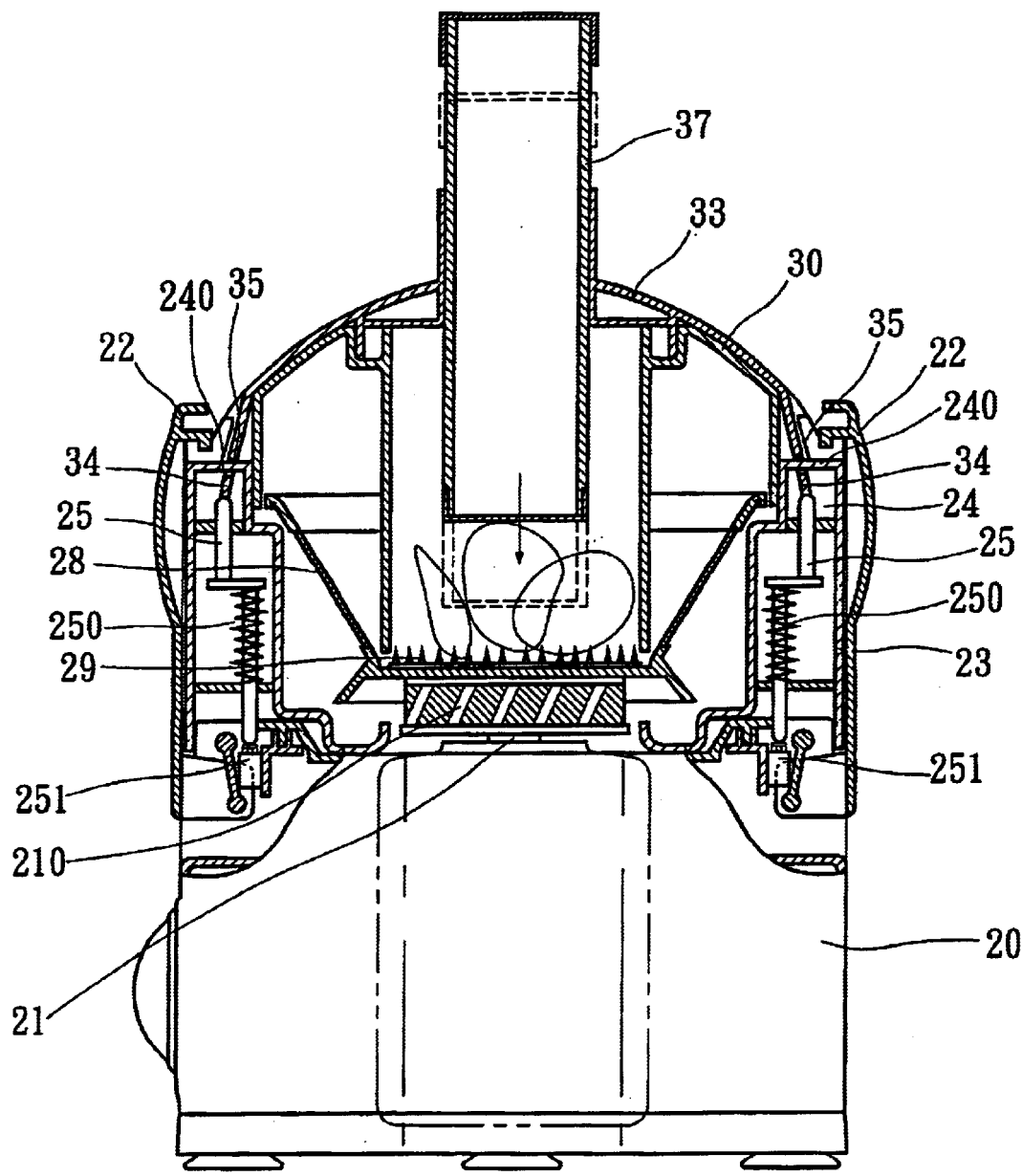
FIG. 4 is a sectional assembly view of the food processor according to the present invention.
Figure 5:
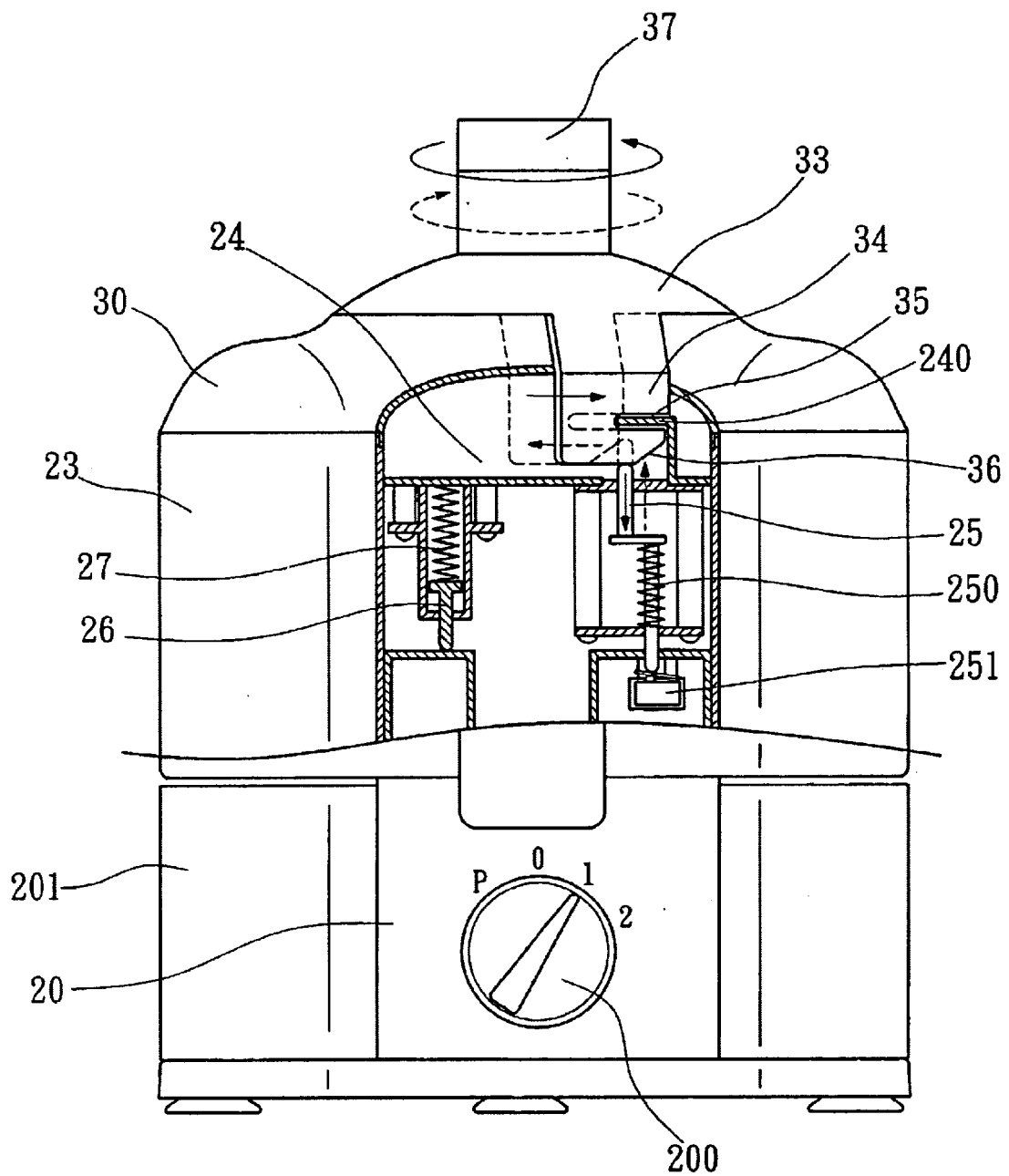
FIG. 5 is a schematic sectional view of the present invention, showing the switch control member rotated between the on position and the off position.

Referring to FIGS. 3~5, a food processor is shown comprised of a motor housing base 20, two containers 201, a work bowl 23, a strainer 28 with cutter blades 29, a top cover 30 having a center feed hole 301 and two retaining holes 31, and a pusher 37. The motor housing base 20 comprises two hook plates 22, a motor (not shown) having a motor shaft 21, a connector 210 at the motor shaft 21, a speed control switch 200, and two touch-control power switches 251. The work bowl 23 comprises two actuating rods 25 supported on a respective spring 250 and adapted to touch the touch-control power switches 251 respectively.

The work bowl 23 comprises two sliding ways 24 bilaterally disposed at the top, and two locating plates 240 suspended above the sliding ways 24 corresponding to the actuating rods 25. The actuating rods 25 are respectively vertically inserted through the sliding ways 24. The top cover 30 has two through holes 32 corresponding to the sliding ways 24 of the work bowl 23. A switch control member 33 is provided above the top cover 30, comprising a center through hole 330, which receives the pusher 37, two extension strips 34 downwardly extended from the periphery at two sides and respectively inserted through the through holes 32 of the top cover 30 into contact with the sliding ways 24 of the work bowl 23. The extension strips 34 each have a bottom guide portion 36 respectively disposed in contact with the sliding ways 24 of the work bowl 23, and a retaining notch 35 for coupling to the locating plates 240. The switch control member 33 can be turned about the pusher 37 to move the respective bottom guide portions 36 along the sliding ways 24 between a first position where the retaining notches 35 of the extension strips 34 are respectively forced into engagement with the locating plates 240 and the actuating rods 25 are forced downwards by the extension strips 34 to switch on the touch-control power switches 251 and to hold the touch-control power switches 251 in "on" position, and a second position where the retaining notches 35 of the extension strips 34 are respectively disengaged from the locating plates 240 and the springs 250 push the respective actuating rods 25 upwards from the respective touch-control power switches 251 and the touch-control power switches 251 are off.

The work bowl 23 further comprises a plurality of shock absorbing springs 27, and a plurality of shock absorbing rods 26 respectively supported on the shock absorbing springs 27 and pressed on the motor housing base 20. The upward reactive force from the shock absorbing rods 26 and the shock absorbing springs 27 hold the work bowl 23 and the top cover 30 firmly together.

According to the present invention, the motor housing base 20, the work bowl 23, the strainer 28, the top cover 30, the switch control member 33 and the pusher 37 can conveniently be separated from one another for cleaning. During assembly, the work bowl 23 is attached to the top side of the motor housing base 20, then the strainer 28 is inserted into the work bowl 23 and connected to the connector 210 at the motor shaft 21, and then the top cover 30 is covered on the work bowl 23 to force the retaining holes 31 into engagement with the hook plates 22, and then the extension strips 34 of the switch control member 33 are respectively inserted through the through holes 32 of the top cover 30 into contact with the sliding ways 24 of the work bowl 23. At this time, the touch-control power switches 251 are off. After food has been put in the strainer 28, rotate the switch control member 33 to force the retaining notches 35 into engagement with the locating plates 240 respectively and to hold the touch-control power switches 251 in "on" position, and therefore the cutter blades 29 are turned with the strainer 28 by the motor shaft 21 to cut food. After processing, rotate the switch control member 33 in the reversed direction to switch off the touch-control power switches 251.

As indicated above, the invention achieves the following advantages:

1. Simply by turning the switch control member about the pusher clockwise or counter-clockwise, the motor is switched on/off.
2. When turned the switch control member to "on" position, the retaining notches 35 of the extension strips 34 are forced into engagement with the locating plates 240, thereby holding the touch-control power switches in "on" position.
3. The shock absorbing rods 26 are supported on the respective shock absorbing springs 27 and pressed on the motor housing base 20 to hold the top cover 30 stably in position, preventing vibration during operation of the food processor.
4. Because two touch-control power switches 251 are used and connected in series, the food processor keeps functioning well when one touch-control power switch 251 fails.
5. The extension strips 34 of the top cover 30 are inserted through the through holes 32 of the top cover 30 and hooked on the locating plates 240 of the work bowl 23, reinforcing the connection between the top cover 30 and the strainer 28.

A prototype of food processor has been constructed with the features of FIGS. 3–5. The food processor functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A food processor comprising:

a motor housing base, said motor housing base having housed therein a motor;

a work bowl mounted on said motor housing base;

a strainer mounted inside said work bowl and coupled to said motor, said strainer having cutter blades mounted therein for cutting food;

a top cover covered on said work bowl;

a pusher inserted through said top cover for pushing food in said strainer; and power control structure adapted to control on/off of said motor;

wherein said power control structure comprises two touch-control power switches mounted inside said motor housing base at two sides and adapted to switch on/off said motor, two sliding ways horizontally bilaterally formed in said work bowl at two sides, two actuating rods respectively vertically inserted through said sliding ways and adapted to switch on said touch-control power switches respectively, two spring members respectively mounted in said work bowl and connected to said actuating rods to hold said actuating rods away from said touch-control power switches, two through holes respectively formed in said top cover at two sides corresponding to said sliding ways of said work bowl, two locating plates respectively formed in said work bowl above said sliding ways, and a switch control member coupled to said pusher and turnable about said pusher to move said actuating rods between a first position where said actuating rods switch on said touch-control switches and a second position where said actuating rods switch off said touch-control switches, said switch control member comprising a center through hole coupled to said pusher, and two extension strips respectively extended from the periphery thereof at two sides and respectively inserted through the through holes of said top cover into contact with said sliding ways, said extension strips each having a bottom guide portion movable with said switch control member along said sliding ways and a retaining notch for engagement with said locating plates to hold said actuating rods in said first position.

2. The food processor as claimed in claim 1, wherein said work bowl comprises a plurality of shock absorbing springs, and a plurality of shock absorbing rods respectively supported on said shock absorbing springs and pressed on said motor housing base.

* * * * *